Aug. 25, 1925.
K. O. NELSON
1,551,166
TWO-WAY VALVE
Filed April 24, 1923
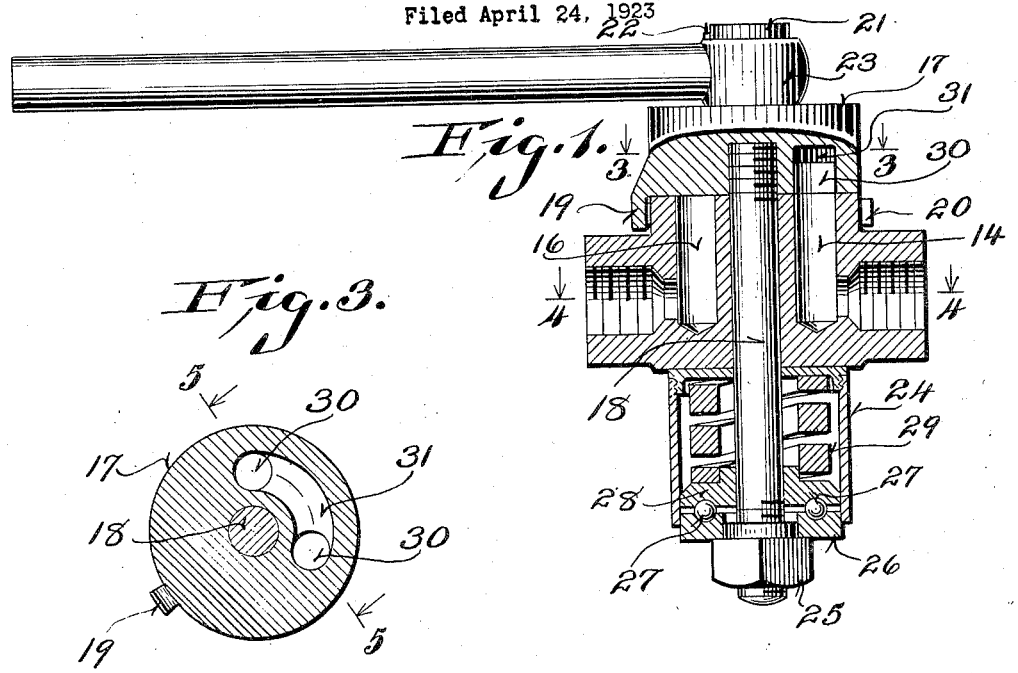
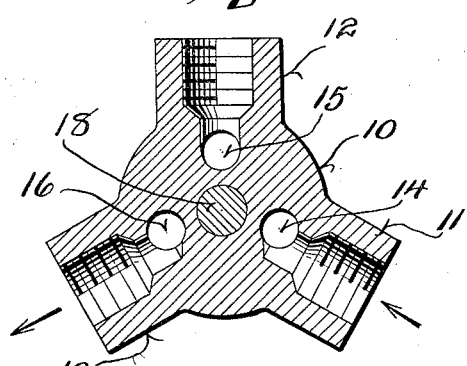
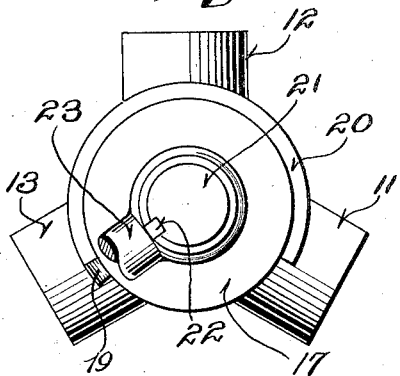
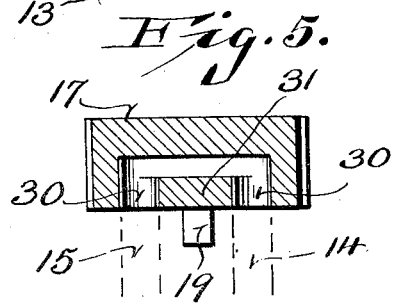
Inventor
Karl O. Nelson Patented Aug. 25, 1925.

1,551,166

UNITED STATES PATENT OFFICE.

KARL O. NELSON, OF MILWAUKEE, WISCONSIN.

TWO-WAY VALVE.

Application filed April 24, 1923. Serial No. 634,219.

*To all whom it may concern:*

Be it known that I, KARL O. NELSON, a citizen of the United States, and resident of Milwaukee, in the county of Milwaukee and State of Wisconsin, have invented certain new and useful Improvements in Two-Way Valves; and I do hereby declare that the following is a full, clear, and exact description thereof.

The invention relates to two-way valves of a type adapted to operate under and withstand hydraulic pressure. It comprises a valve casing having three recesses therein and three nipples, each of the nipples communicating with one of said recesses. A valve proper is provided having a duct therein and maintained in tight contact with the surface of the casing by means of a spring, the duct being of such length as to operate in one position to connect the recess leading from an inlet nipple to a recess leading to an outlet nipple which is associated with a cylinder. The valve proper is shiftable to bring the duct into a position wherein it permits a return from the last mentioned recess to the third recess which is in communication with a return nipple.

An object of the invention is the provision of a valve mechanism operative under hydraulic pressure, which completely obviates the need for packing. The valve contacts with the surface of the valve casing and prevents the escape of fluid, being maintained snugly in position by the action of a spring.

An object of the invention is the provision of a valve of an especially simple design, adapted to automatically take up wear, durable, of a minimum number of parts easy to manufacture and of ready assembly.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Figure 1 is a vertical section through the valve showing the top thereof in full lines.

Figure 2 is a plan view of the structure shown in Figure 1.

Figures 3 and 4 are sections on the lines 3—3 and 4—4 respectively of Figure 1.

Figure 5 is a section on the line 5—5 of Figure 3.

Casing 10 is substantially cylindrical and has an inlet nipple 11 thereon leading from a suitable source of pressure, an outlet nipple 12 thereon adapted to lead to a cylinder where pressure is to be applied and a return nipple 13 thereon, for the return of the fluid. From the upper surface of the casing the cylindrical recess 14 extends downwardly and communicates with the opening in inlet nipple 11. Similarly recess 15 communicates with the opening in outlet nipple 12 and recess 16 communicates with the opening in return nipple 13.

A cylindrical valve 17 is supported on the upper surface of the valve casing and is threaded on a rod 18 journalled in the casing. The valve is provided with a lug 19 extending downwardly and adapted to contact on rotation with the ends of rib 20 which extends radially from the casing. Integral with the valve is an extension 21 having a key-way therein receiving key 22 which makes the extension rigid with handle 23.

The other end of rod 18 projects through an opening in a cup shaped housing 24 and has a hexed nut 25 on the end thereof which abuts against a lower race 26 for ball bearings 27. The race extends into the mouth of the cup and contacts with the wall of the cup. An upper recess 28 for the bearings is urged downwardly by a spring 29 which at its upper end contacts with the end of the housing. Spring 29 operates to maintain valve 17 in tight contact with the surface of casing 10. The spring operates automatically to take up wear of parts.

Valve 17 is provided with a duct 30 which extends upwardly over a rib 31 the length of the duct being such that in one position of the valve one end of the duct communicates with recess 14 and the other end communicates with recess 15. In this position pressure is exerted through inlet nipple 11 and outlet nipple 12. Lug 19 in this position is in contact with rib 20 as shown in Figure 2. By moving the handle 23 in a counter clock-wise direction looking at Figure 2 the lug is brought against the other end of rib 20. The duct then communicates with recesses 15 and 16.

When the duct is in communication with recesses 14 and 15 the pressure on the valve urging it away from the casing is greater than when the valve is in any other position, because the pressure is applied throughout the entire length of the duct. Consequently, the friction between the valve and the casing resulting from the pressure of spring 29, is decreased by the action of the fluid. The valve may therefore, be more easily turned. When neither of the ends of the duct 30 is in communication with a recess, pressure is not applied through the valve nor is there any return.

The device is made of a minimum number of parts. Each of the parts is simple in outline and especially easy to manufacture, so that the valve may be turned out at an extremely low cost of production. The assembling of parts is readily effected. Valve 17 may be quickly secured to rod 18 and the rod slid through the valve casing and the housing, and the nut 25 adjusted on the end.

Claims:

1. A valve comprising a body portion having three fitting-receiving apertures extending thereinto, said body portion having a flat face and having three ducts opening through said face and communicating with said apertures, a movable disk forming the exposed top of the valve having a flat face in contact with the flat face of said body portion, a rod carried by said disk and extending through the body portion, a spring surrounding said rod and urging such rod downwardly, said disk having a pair of spaced apertures extending through its flat face and having a duct connecting said apertures and located completely within the body of said disk, and means for operating said disk.

2. The combination of a valve casing having a flat upper surface, an inlet nipple on said casing, an outlet nipple on said casing and a return nipple on said casing, each of said nipples having an opening therethrough, said casing having a recess extending downwardly from said surface and communicating with an opening in said inlet nipple, a second recess extending downwardly from said surface and communicating with said outlet nipple and a third recess extending downwardly from said surface and communicating with said return nipple, a valve having a flat face, resilient means for retaining the flat face of said valve against said surface, a duct extending through said valve and having two opening ends, said duct being of such length as to communicate in one position of said valve at one end with the first mentioned recess and at the other end with said second recess, said duct being adapted to communicate in another position at one end with said third recess and at the other end with said second recess, said valve casing having a channel therethrough, a rod threaded at one end in said valve and extending through said channel and a cup shaped housing below and in contact with said valve casing, a helical spring in said housing contacting at one end with the end of said housing, a race about said rod abutting against the other end of said spring, a second race about said rod, ball bearings between said races, a nut threaded on the end of said rod, said housing overlapping a portion of said second race, said nut limiting the outward movement of said second race, said spring operating to maintain the face of said valve snugly against said surface.

In testimony that I claim the foregoing I have hereunto set my hand at Milwaukee, in the county of Milwaukee and State of Wisconsin.

KARL O. NELSON.